United States Patent [19]
Cavanagh

[11] 3,866,025
[45] Feb. 11, 1975

[54] SPACECRAFT ATTITUDE CONTROL SYSTEM

[75] Inventor: John Denis Cavanagh, Ardmore, Pa.

[73] Assignee: RCA Corporation, New York, N.Y.

[22] Filed: Mar. 15, 1973

[21] Appl. No.: 341,775

[30] Foreign Application Priority Data
Mar. 17, 1972  Great Britain..................... 12698/72

[52] U.S. Cl............................. 235/150.2, 244/15 A
[51] Int. Cl............................................... G05d 1/10
[58] Field of Search................ 244/15 A; 235/150.2

[56] References Cited
UNITED STATES PATENTS

| | | | |
|---|---|---|---|
| 2,974,594 | 3/1961 | Boehm............................ | 244/1 SA |
| 3,231,223 | 1/1966 | Upper........................... | 244/1 SA X |
| 3,511,452 | 5/1970 | Smith et al...................... | 244/1 SA |

Primary Examiner—Charles E. Atkinson
Assistant Examiner—R. Stephen Dildine, Jr.
Attorney, Agent, or Firm—Edward J. Norton; Joseph D. Lazar

[57] ABSTRACT

A system wherein orbit-adjust thrusters of a Pitch Momentum Bias spacecraft are used to perform both orbital inclination adjustment and roll and/or yaw attitude control. A strapdown inertial reference system comprising two rate gyros is operated in conjunction with an on-board computer to derive the shortest angle through which the total angular momentum vector of the spacecraft must be rotated to bring it into alignment with the orbit normal vector and the ideal torque to produce this rotation of the total angular momentum vector. The computer is then operated to select a combination of orbit adjust thrusters which produce a torque which best approximates the ideal torque and to control their firing to achieve the alignment of the total angular momentum vector with the orbit normal vector. Thereafter, the computer is operated to select the combination of orbit adjust thrusters which produce a torque to reduce the roll and/or yaw angular attitude error rates of the spacecraft. In one operation, both orbit inclination adjustment and attitude control are performed simultaneously.

18 Claims, 9 Drawing Figures

SPACECRAFT ATTITUDE CONTROL SYSTEM

BACKGROUND OF THE INVENTION

1. Field of the Invention

This invention relates to satellite control systems and more particularly, to systems for automatic adjustment of both orbit adjust and attitude control of a satellite.

2. Description of the Prior Art

The advancement of the art of earth surveillance and communication systems by means of artificial satellites, whether for the military, for the scientific community, or for industry, has brought constantly increasing demands on spacecraft pointing accuracy. To meet this requirement, ever-increasing improvements in attitude-sensing and attitude-control techniques have been sought.

In one class of satellites, including, for example, synchronous communications satellites, an orbit adjust capability is required. The orbit adjust subsystem comprises sets of coplanar thrusters all fixedly directed in the same direction and producing as nearly uniform thrust force as possible. These thrusters generally combust a fuel such as hydrazine to achieve thrust force. Orbit adjust is achieved by firing all the thrusters within a single set of coplanar thrusters. During this orbit adjust maneuver, it is necessary to constrain the spacecraft in attitude to ensure that the firing of the coplanar orbit adjust thrusters efficiently and accurately changes the orbit of the spacecraft. That is, if the spacecraft is not pointing in the correct direction during orbit adjust, the orbit adjust thrusters will fire in a wrong direction and thereby achieve an incorrect orbit.

The principal source of disturbance torque on the spacecraft causing pointing or attitude error during orbit adjust is the orbit-adjust engines themselves and their slight geometrical asymetries relative to the spacecraft center of gravity. With a given geometrical engine array, disturbance torques will arise from three causes: lack of parallelism of engine forces, moment-arm length differences from the spacecraft's center of gravity to the individual engines, and force profile mismatches between the engines. Under the influence of a disturbance torque, such a spacecraft will experience two basic motions: a precession in space of it total angular momentum vector, and a nutational motion of the biased momentum axis about the total angular momentum vector.

Heretofore, attitude control subsystems have been provided separate from the orbit-adjust subsystems for purposes of attitude control. Aside from the additional weight and additional cost of the subsystem required to control the spacecraft's attitude, prior art attitude control subsystems do not operate simultaneously with the orbit adjust subsystem to correct the spacecraft's attitude while the spacecraft's orbit was being changed.

One type of control subsystem includes several clusters of cold gas thrusters for expelling gas such as dry nitrogen. Each thruster within a cluster is aligned along or in relation to a body axis (pitch, roll, and yaw) of the spacecraft. One such attitude control system is described in U.S. Pat. No. 3,231,223, Flight Attitude Control System, issued to Charles E. Upper on Jan. 25, 1966. Such a separate thruster attitude control subsystem adds weight and cost to the spacecraft because it requires gas supply tanks, cold gas, nozzle, solenoid nozzle control, plumbing and electronics. In addition, the use of cold gas in such a system requires severe decontamination restraints in the "plumbing" between the supply tanks and nozzles. Additional expenditures of fuel are required after orbit adjust to correct the spacecraft's attitude.

Another type of subsystem used to control the attitude of the spacecraft uses magnetic torquing wherein a current is introduced into a coil mounted on the spacecraft and as a result, the spacecraft is urged toward a more favorable attitude or pointing direction. Up until a few years ago, these magnetic torquing schemes required GROUND processing of attitude data, the formulation of suitable control commands, and the periodic updating of the settings of the spacecraft attitude control system. In general, the accuracy of this type of system was limited to 0.5° in control of the pointing direction.

Subsequently, magnetic torquing means to achieve attitude control of a pitch biased momentum spacecraft (a spacecraft having a momentum wheel to provide pitch stability) were improved so that attitude control could be accomplished automatically by an on-board, closed loop system, with improved accuracy, assuming that roll and yaw information was available at frequent intervals. Although roll data suitable for the purposes of this type of attitude control may be readily available from many different kinds of horizon sensors, no simple means exists for monitoring yaw aboard a spacecraft suitable for this particular type of attitude control. Yaw sensing is now accomplished by means of expensive and sophisticated equipment, such as yaw gyro or a star sensor. The yaw gyro requires frequent updating and the usual star sensor, such as the Polaris sensor, present somewhat of a weight penalty. A primary disadvantage of magnetic torquing type of attitude control system is that the torques produced are too small to be effective in correcting attitude during the brief orbit adjust burns.

SUMMARY OF THE INVENTION

According to the invention, a spacecraft includes a set of orbit adjust thrusters which are fired singly or in combination to adjust the orbit of the spacecraft and also to control the attitude of the spacecraft during the orbit adjust maneuver. The spacecraft includes a thruster control system comprising an on-board computer coupled to a thruster firing control means and an attitude sensing means. The attitude of the spacecraft is related to the magnitude and direction of the total angular momentum vector of the spacecraft. The on-board computer initiates a first mode of operation wherein the thruster control means is commanded to fire all the thrusters within the set of orbit adjust thrusters to cause the spacecraft to move from a first orbit path to a second orbit path. The on-board computer receives angular attitude error information, indicating the angular position of the spacecraft's body axes to a set of attitude reference vectors, from the attitude sensing means and computes therefrom the rates of change of the angular attitude errors, the precession angle between the total angular momentum vector and one of the attitude reference vectors, and the direction of the ideal torque required to reduce the precession angle. In a precession mode of operation, the on-board computer selects a first thruster firing configuration which produces a torque in accordance with the direction of the ideal torque which is a best approximation to the direction of ideal torque to reduce the precession angle, and thereby control the direction of the total angular momentum vector whenever the precision angle equals or exceeds a predetermined precession threshold. In a rate mode of operation the onboard computer selects a second thruster firing configuration, which produces a torque to reduce the attitude angular error rates and thereby control the magnitude of the total angular momentum vector whenever an attitude angular error rate equals or exceeds a predetermined rate threshold.

BRIEF DESCRIPTION OF THE DRAWINGS

The same reference numbers in different figures refer to the same item.

DESCRIPTION OF A TYPICAL SPACECRAFT UTILIZING THE INVENTION (FIG. 1)

Figure 1:
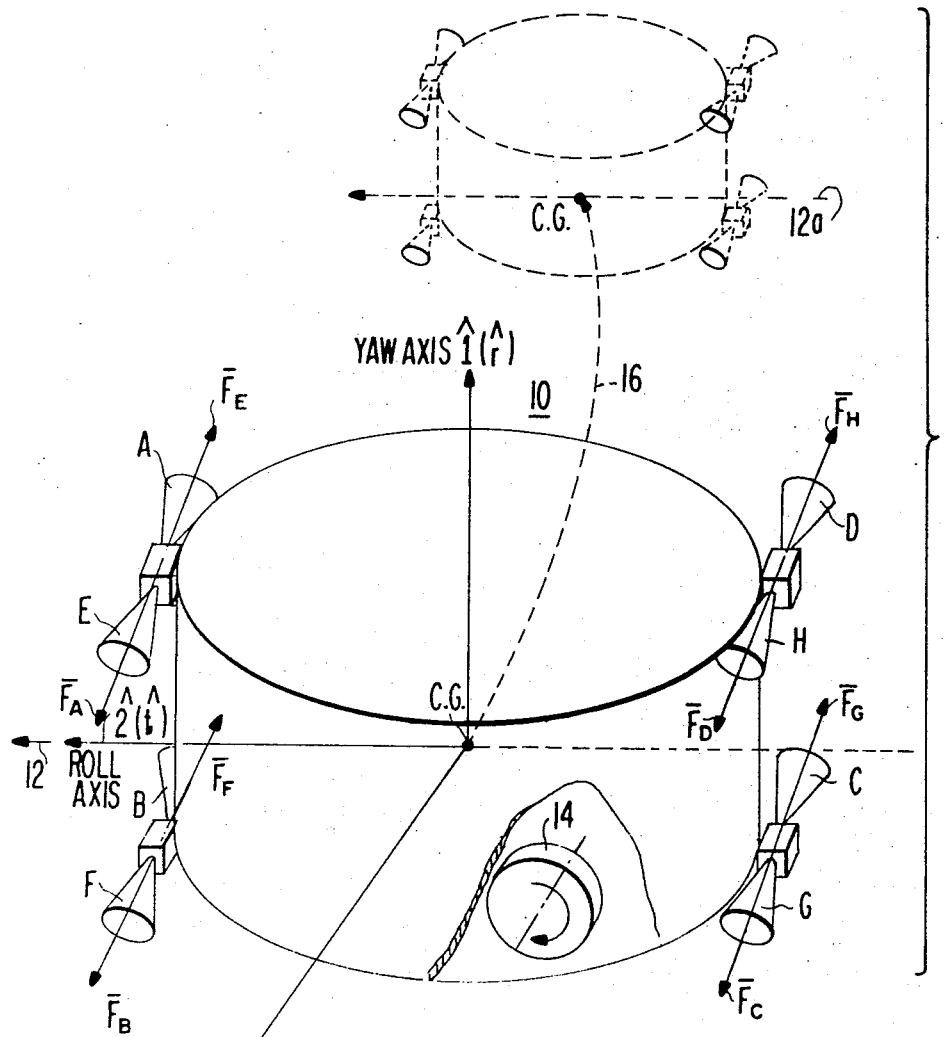
FIG. 1 is a perspective view of a typical spacecraft embodying the system of the present invention.

FIG. 1 is a perspective view of a spacecraft 10 embodying the invention. Spacecraft 10 is moving along orbit path 12, which may be either an elliptical or circular orbit around a celestial body, such as the earth, or may be a path between any two points within space. For the present description, spacecraft 10 is assumed to be moving along orbit path 12 with the correct attitude. For the purposes of this description, a spacecraft or satellite will be defined to have correct attitude when the yaw, roll and pitch body axes of the spacecraft, represented respectively, by unit vectors $\hat{1}, \hat{2},$ and $\hat{3}$ are coincident, respectively, with the unit vector $\hat{r}, \hat{t},$ and $\hat{n}$. For the purposes of this description the symbol $\wedge$ will indicate a unit vector. A unit vector is directed along a particular direction and has a magnitude of one. Mutually perpendicular unit vectors $\hat{r}, \hat{t},$ and $\hat{n}$ define the local-vertical orbit plane reference system. In the local-vertical orbit plane reference system, the unit vector $\hat{t}$ is coincident with the orbit path and is positive in the direction of the spacecraft motion. The unit vector $\hat{r}$ represents the instantaneous local vertical direction and is positive in the direction shown. The unit vector $\hat{n}$ is called the normal vector, and is positive in the direction shown. The body axis unit vectors $\hat{1}, \hat{2},$ and $\hat{3}$ are coincident at the center of gravity C.G. of spacecraft 10. The spacecraft's attitude is incorrect when any one of its body axes, $\hat{1}, \hat{2},$ or $\hat{3}$ is noncoincident with respect to some tolerance limit, with its respective local-vertical orbit plane reference unit vector $\hat{r}, \hat{t},$ and $\hat{n}$.

Spacecraft 10 is a pitch bias type of spacecraft. That is, spacecraft 10 is maintained in correct pitch attitude by a subsystem which prevents rotation about the pitch axis $\hat{3}$. In particular, spacecraft 10 is maintained in correct pitch attitude by means of a subsystem including momentum wheel 14 rotating about an axis parallel to the pitch axis system. Momentum wheel 14 is of such mass and is spun with such angular velocity in response to control signals from a pitch axis attitude control system, not shown, that the resultant inertia of momentum wheel 14 prevents rotation around the spacecraft's pitch axis. Although the invention will be described in relation to a pitch bias momentum spacecraft, it will be appreciated that the invention is generally useful in other types of spacecraft. For instance, the invention may be advantageously employed in a type of spacecraft stabilized by an active three axis zero momentum system wherein momentum wheels are rotating about each of the body axes.

Two sets of coplanar thrusters, A through D forming one set, and E through H forming the other set, are mounted on spacecraft 10 in a plane parallel to the plane formed by the yaw and roll axis. The location plane of thrusters A thorugh H may or may not be coincident with the plane formed by the yaw and roll axes. Each set of coplanar thrusters has individual thrusters aligned along axes which are parallel to the pitch axis. All the thrusters within a set are directed along axes parallel to the pitch axis and when fired produce forces substantially of the same magnitude and substantially parallel to the pitch axis. Thrusters A through H generally burn a combustable fuel such as hydrazine, and, depending on the physical characteristics of the thruster such as nozzle diameter, produce forces of approximately 0.1 lbs. Firing thrusters A, B, C, and D produce forces respectively represented by force vectors $\overline{F}_A, \overline{F}_B, \overline{F}_C$ and $\overline{F}_D$ directed in the positive pitch axis direction causing a spacecraft 10 to move in the direction of the negative pitch axis. Firing thrusters E, F, G, and H produce forces respectively represented by force vectors $\overline{F}_E, \overline{F}_F, \overline{F}_G$ and $\overline{F}_H$ directed in the negative pitch axis direction causing spacecraft 10 to move in the direction of the positive pitch axis. Thrusters A through H are orbit inclination adjust thrusters. For the purpose of this description, the terms "orbit inclination adjust" and "orbit adjust" are synonymous. For the remainder of the specification it is to be understood that the term "thruster" and "engine" are interchangeable. When it is desired to adjust the orbit or spacecraft 10 all the thrusters within a coplanar set are simultaneously fired. For instance, if thrusters A, B, C, and D are fired, spacecraft 10 moves along path 16 lying in the plane defined by the roll and pitch body axes, to a final position indicated in phantom.

Ideally, each thruster within a coplanar thruster set has an axis which is parallel to the pitch axis located at the same distance as every other thruster within the set from the spacecraft's center of gravity C.G. and when fired, produces the same magnitude of thrust or force as every other thruster within the set. In practice, there are thruster force imbalances and geometrical asymetries which give rise to disturbance torques when the thrusters are fixed to an orbit adjustment. These disturbing torques produce attitude errors, which is turn cause the force produced by the simultaneous firing of the orbit adjust thrusted to be directed inaccurately resulting in an incorrect final orbit. Attitude errors are also caused by imbalanced attractions of various portions of the spacecraft by celestial bodies and such phenomenon as solar torquing and the like.

Figure 2:
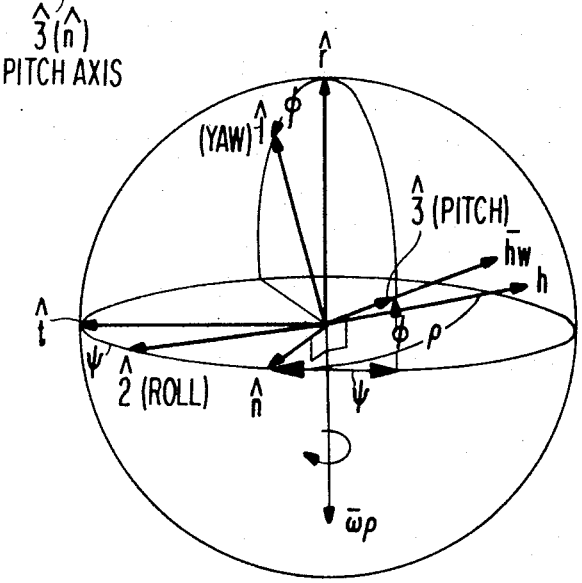
FIG. 2 is a vector diagram of the relation of the body axes of the spacecraft of FIG. 1 to the axes of the local vertical orbit plane reference system of the spacecraft with attitude error.

Vector Diagram of Attitude Orientation (FIG. 2)

Before describing the thruster control system for spacecraft 10, the vectors of the spacecraft's attitude orientation will be described. Referring now to FIG. 2, there is shown a vector diagram of the relation of spacecraft 10's body axes ($\hat{1}, \hat{2}$, and $\hat{3}$) in relation to the local vertical orbit plane reference system ($\hat{r}, \hat{t}$, and $\hat{n}$) as the attitude of spacecraft 10 becomes displaced from the correct attitude orientation. The angle $\phi$ is the angle through which the yaw axis $\hat{1}$ is rotated away from the instantaneous local vertical $\hat{r}$ about the roll axis $\hat{2}$. The angle $\psi$ is the angle through which the roll axis $\hat{2}$ is rotated away from $\hat{t}$ about the yaw axis $\hat{1}$. It should be noted that an angle representing rotation about the pitch axis $\hat{3}$ is not present since spacecraft 10 is a pitch bias momentum type of spacecraft wherein rotation about the pitch axis is prevented by a separate subsystem comprising a momentum wheel 14.

Bias momentum vector $\bar{h}_w$ is directed along the pitch axis $\hat{3}$ and is indicative of spacecraft 10's bias toward attitude stability about the pitch axis $\hat{3}$ due to momentum wheel 14. The total angular momentum $\bar{h}$ of spacecraft 10 is only slightly displaced from the vector $\bar{h}_w$ for reasons that will later become apparent. To bring spacecraft 10 into correct attitude, total angular momentum vector $\bar{h}$ must be brought into alignment (within some tolerance limits) with orbit normal vector $\hat{n}$ and the magnitude of total angular momentum vector $\bar{h}$ must be made equal (with some tolerance limits) to the magnitude of bias momentum vector $\bar{h}_w$. The vector $\bar{\omega}_p$ is called the precession vector and is perpendicular to the plane formed by orbit normal vector $\hat{n}$ and total momentum vector $\bar{h}$ and defines the axis about which total momentum vector $\bar{h}$ must be rotated into to bring it into alignment with orbit normal vector $\hat{n}$. Angle $\rho$ separates the vectors $\bar{h}$ and $\hat{n}$, in the plane formed by total momentum vector $\bar{h}$ and orbit normal vector $\hat{n}$ and is the shortest angle through which total angular momentum vector $\bar{h}$ can be rotated to bring it into alignment with orbit normal vector $\hat{n}$.

Figure 3:
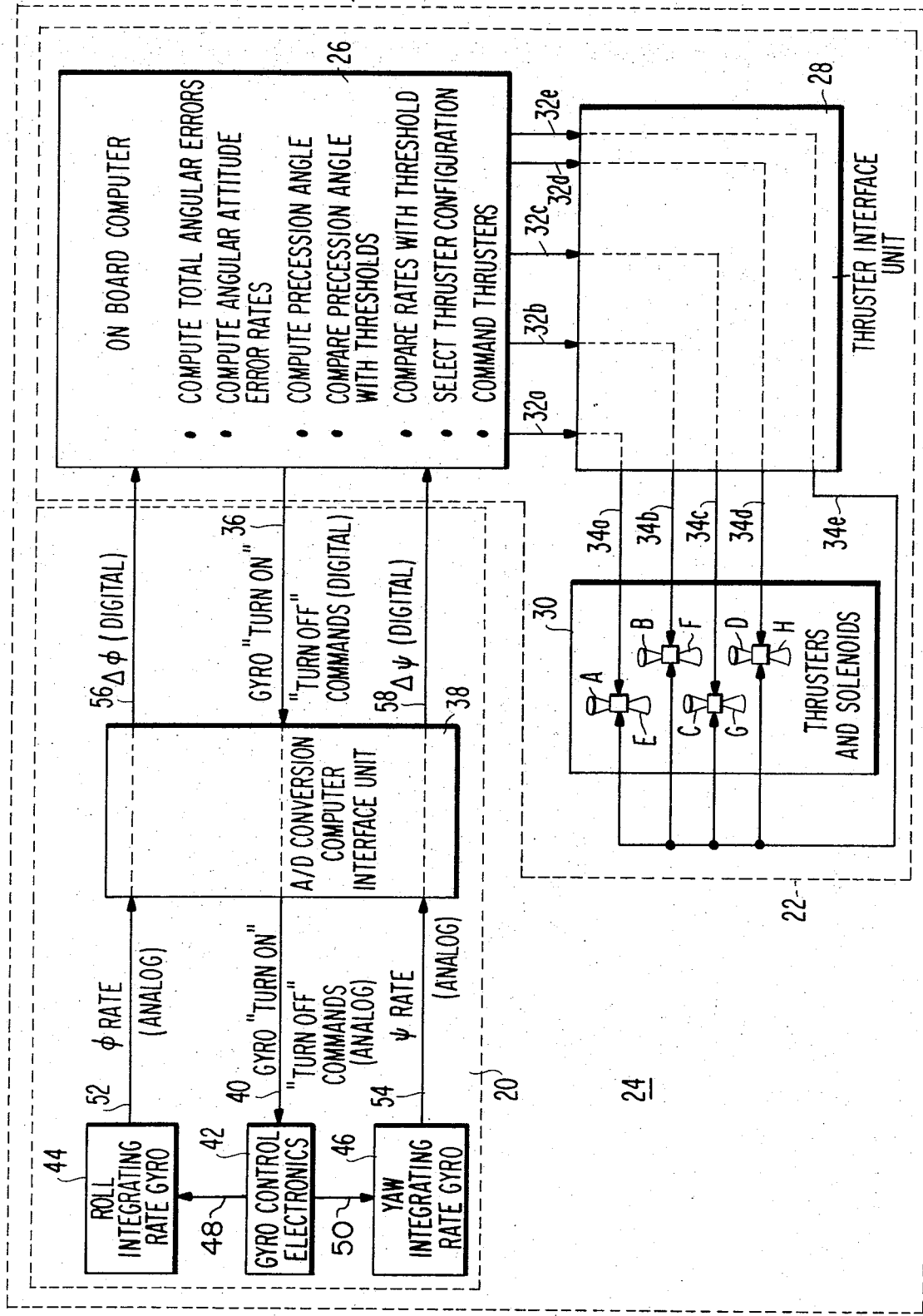
FIG. 3 is a block diagram of a thruster control system embodying the invention in the spacecraft of FIG. 1.

Thruster Control System (FIG. 3)

Reference is now made to FIG. 3, which is a block diagram of the thruster control system 24 of spacecraft 10 of FIG. 1. Thruster control system 24 includes orbit adjust control system 22 and attitude sensors and controls 20.

Orbit adjust control system 22 includes a suitable on-board computer 26 for derivation and routing of spacecraft control signals, including thruster control signals for thrusters A through H, thruster interface unit 28, and thruster and solenoid unit 30. On-board computer 26 generates digital control signals which manifests information pertaining to the selection of thruster combinations, as will be explained, and information pertaining to the duration of thruster burn. This information is transmitted from on-board computer 26 to thruster and solenoid unit 30 via thruster interface unit 28 upon reception of an orbit adjust signal from a source external to the spacecraft such as an earth station or the like. Alternately, the computer may be programmed, either under hardware or software control, to periodically automatically initiate orbit inclination adjustments.

The digital signals manifesting thrusting control information are coupled to the thruster interface unit 28 via control lines 32a through 32e. Control lines 32a through 32d respectively, control the operation of either one of a pair of thrusters. For example, control line 32a carries the digital signal to operate either thruster A or thruster E, whereas control line 32b carries the digital signal which controls the operation of either thruster B or thruster F. Control line 32e carries the digital signal to enable one of the two sets of coplanar thrusters. That is, the transmission of one digital signal through control line 32e will enable a thruster in the set of thrusters consisting of thrusters A, B, C, and D to fire, whereas a second digital signal on line 32e will cause a thruster in the set of thrusters consisting of thrusters E, F, G, and H to fire. For instance, if it is desired to fire thruster A, a digital signal enabling the coplanar thruster set consisting of thruster A through D will be transmitted along control line 32e while a digital signal causing either thruster A or E to fire will be transmitting along control line 32a. The digital signals transmitted by the computer along conductors 32a through 32e may be either of the level type or the type utilizing a suitable sequential code.

It is to be noted that, if spacecraft 10 had a separate system for attitude correction, lines 32a through 32d would not be present and, instead, a single control line would carry a digital control signal manifesting the command for all of the thrusters within the selected one of thrusters sets of coplanar thrusters to fire simultaneously. However, since attitude control system 24 eliminates the necessity of a separate attitude control system within spacecraft 10 by utilizing the orbit adjust thrusters A through H to also correct attitude, lines 32a through 32d are necessary to individually control individual members of a set of thrusters as will be described.

Thruster interface unit 28 has the function of receiving the digital control signals which manifest the thruster on-off commands and converting them to appropriate analog signals of suitable amplitude and duration to control the firing of thrusters A through H. The analog versions of the digital control signals carried by control lines 32a through 32e are carried by control lines 34a through 34e, respectively, to thruster and solenoid control unit 30 from interface unit 28. Each thruster is operated by the activation or deactivation of a respective solenoid, not shown, which selectively allows fuel to pass from tanks, not shown, to a respective thruster upon the reception of an analog control signal.

When orbit adjust is initiated, on-board computer 26 initiates a digital command signal to "turn on" roll and yaw integrating rate gyros, respectively 44 and 46. The digital "turn on" command signal is carried by control line 36 to A/D (analog to digital) conversion and computer interface unit 38. In response to the digital "turn on" command signal A/D conversion and interface unit 38 produce an analog "turn-on" command which is carried to gyro control electronics unit 42 by control line 40. Gyro control electronics unit 42 is coupled to roll and yaw integrating rate gyros, respectively 44 and 46, by control lines 48 and 50, respectively. Upon the reception of the analog "turn-on" control signal, gyro control electronics unit 42 transmits an analog signal to turn on each of the two integrating rate gyros, 44 and 46, which have been heretofore in an off condition.

Rate integrating gyros 44 and 46 are operated in their rate mode. The function of each integrating rate gyro 44 and 46 is to provide an anglog signal manifesting the rate of angular change of one spacecraft 10's body axes from its correct attitude position relative to the axes of the local vertical orbit plane reference system. That is, roll integrating rate gyro 44 senses the rate of change of $\Delta\phi$. $\Delta\phi$ is the incremental angular movement of the yaw axis $\hat{1}$ away from the instantaneous local vertical $\hat{r}$ about the roll axes $\hat{2}$. Yaw integrating rate gyro 46 senses the rate of change of $\Delta\Psi$. $\Delta\Psi$ is the incremental angular movement of the roll axis $\hat{2}$ away from the $\hat{r}$ about the yaw axis $\hat{1}$. It is to be noted that roll and yaw integrating rate gyros, respectively 44 and 46, are turned off except during attitude correction because, otherwise, they would be susceptable to electronic noise signals generated in the system which would be interpreted as incremental roll and yaw attitude errors. After the orbit adjust maneuver has been completed, on-board computer 26 initiates a digital command to "turn off" roll and yaw integrating rate gyros, respectively 44 and 46, which is carried by central line 36 to A/D conversion and interface unit 38 and then by control line 40 to gyro control electronics unit 42. It is to be also noted that although rate gyros are employed in this embodiment of the invention, any other suitable transducers which are capable of sensing attitude change may be used. The analog signals manifesting the rates of change of $\Delta\phi$ and $\Delta\Psi$ are carried by conductors 52 and 54 respectively to A/D conversion and computer interface unit 28.

A/D conversion and computer interface unit 38 receives the analog signals manifesting the rates of change of $\phi$ and $\Psi$ respectively from roll and yaw integrating rate gyros and integrates them, as is well known in the art, to form digital signals manifesting incremental angular attitude errors $\Delta\phi$ and $\Delta\Psi$. These digital signals may be of the level or of the sequential code type. The digital signals manifesting the roll and yaw attitude errors carried by conductors 56 and 58, respectively, to on board computer 26. On board computer 26 contains provisions for typical computer operations such as memory storage, arithmetic computation, comparison, and the like may be controlled by a software program or may have hardware program control as is well known in the art.

On board computer 26 uses the incremental roll and yaw attitude errors to compute the total angular roll and yaw errors by a conventional computer addition process. To compute the total angular error with reference to a body axis, the resultant sum of previous incremental attitude errors stored in a memory location are read out from the memory location to the arithmetic unit where they are added to the present incremental angular attitude error. The present resultant sum is then returned to the memory location for that particular body axis attitude error for further use in computations to select the most appropriate thrust or firing configuration to eliminate the attitude error as will be described. In addition to computing the total angular yaw and roll attitude errors, the computer is also controlled to compute the rates of change of the angular yaw and roll attitude errors. To compute a rate of change with reference to a body axis, the present incremental attitude error, for instance $\Delta\phi$, together with the time duration $\Delta t_{\Delta\psi}$ during which it has occurred is transferred to the computer's arithmetic section. Through a suitable digital division routine, as is well known in the art, the ration of the incremental attitude error $\Delta\phi$ to the time duration $\Delta t_{\Delta\phi}$ during which it has occurred is computed. In this manner, the yaw and roll body rates respectively $\omega_1 = \Delta\psi/\Delta t_{\Delta\phi}$ and $\omega_2 = \Delta\phi/\Delta t_{\Delta\phi}$ are computed. These body rates are then stored in memory locations for further use in selecting the thruster firing configuration to reduce the attitude error. It is to be noted that during attitude correction the on board computer is constantly receiving new incremental attitude errors and calculating new body rates and updating the data in the corresponding memory locations.

ther use in selecting the thruster firing configuration to reduce the attitude error. It is to be noted that during attitude correction the on board computer is constantly receiving new incremental attitude errors and calculating new body rates and updating the data in the corresponding memory locations.

Development of Expressions for Precession Angle $\rho$ And Actual Torque $\overline{T}$ In Terms of the Body Axis Before developing the mathematical expression for $\rho$, the shortest angular distance through which the total angular momentum vector $\overline{h}$ is to be rotated to bring it into alignment with orbit normal vector $\hat{n}$, and actual or ideal torque $\overline{T}$ necessary to accomplish this rotation, some vector geometry used in the development is presented.

A vector $\overline{A}$ having a magnitude $A$ may be expressed as $$\overline{A} = A\hat{A}. \tag{1}$$

where $\hat{A}$ is a unit vector having a magnitude of 1 and being directed, in the same sense, along the vector A. From this expression it should be apparent that unit vector $\hat{A}$ may be expressed as $$\hat{A} = \overline{A}/A. \tag{2}$$

The dot product of two vectors $\overline{A} = A\hat{A}$ and $\overline{B} = B\hat{B}$ having an angle $\beta$ between them is mathematically defined as $$\overline{A} \cdot \overline{B} = AB \cos \beta. \tag{3}$$

It should be apparent from equation 3 that the dot product of two vectors is a scalar. The cross product of the two vectors $\overline{A} = A\hat{A}$ and $\overline{B} = B\hat{B}$ is a vector defined by the equation $$\overline{A} \times \overline{B} = (AB \sin \beta) \hat{C} \tag{4}$$

where $\hat{C}$ is a unit vector in a direction mutually perpendicular to the vectors $\overline{A}$ and $\overline{B}$. The positive direction of $\hat{C}$ is defined as the direction a right hand screw would progress along its axis if it were turned through the angle $\beta$ from vector $\overline{A}$ to vector $\overline{B}$. It should further be noted that the order of the vectors in a cross product is determinative of the positive sense of the resulting vector. That is, $$\overline{A} \times \overline{B} = -\overline{B} \times \overline{A} \tag{5}$$

The mathematical expressions for $\overline{T}$ and $\rho$ will now be described with some reference to FIG. 2. If the period of application of torque $\overline{T}$ to spacecraft 10 is short compared with the period of the nutational motion of the spacecraft 10, the resultant motion is a precession of the total angular momentum vector $\overline{h}$.

The actual or ideal torque $\overline{T}$ required to cause the precessional or rotational motion of total angular momentum vector $\overline{h}$ through angle $\rho$ about vector $\hat{\omega}_\rho$ to bring it into coincidence with orbit normal vector $\hat{n}$ and thereby correct the attitude of the spacecraft is given by the expression $$\bar{T} = \bar{\omega}_\rho \times \bar{h} \qquad (6)$$

Since the magnitude of force exerted on spacecraft 10 of FIG. 1 by an orbit adjust thruster when fired is fixed, and the same for each thruster A through H, the remaining portion of this development is concerned with the direction of the actual or ideal torque to achieve attitude correction rather than its magnitude. It should be apparent to those skilled in the art that if the force of thrusters A through H were variable, a similar development could be made without exceeding the scope of the invention.

Since the vectors $\bar{\omega}_\rho$ and $\bar{h}$ are perpendicular the result of their cross produce, ideal torque $\bar{T}$ is perpendicular to both of these vectors. Therefore, equation (6) may be written in terms of unit vectors as follows:

$$\hat{T} = \hat{\omega}_\rho \times \hat{h} \qquad (7)$$

The vector $\bar{\omega}_\rho$ is given by the expression $$\bar{\omega}_\rho = \omega_\rho \, \hat{\omega}_\rho = \bar{h} \times \hat{n} = h \sin \rho \, \hat{\omega}_\rho \qquad (8)$$

Therefore $$\bar{\omega}_\rho = (\bar{h} \times \hat{n}/h \sin \rho) = (\hat{h} \times \hat{n}/\sin \rho) \qquad (9)$$

Substituting equation (9) into equation (7)

$$\hat{T} = [\hat{h} \times \hat{n}/\sin \rho] \times \hat{h} \qquad (10)$$

It will be appreciated by those skilled in the art that equation (10) may be simplified using certain well known identities of vector analysis to become $$\hat{T} = [\hat{n} - (\cos \rho) \, \hat{h}/\sin \rho] \qquad (11)$$

When $\rho$ is a very small angle, $\cos \rho = 1$ and $\sin \rho = \rho$ where $\rho$ is expressed in radians. Therefore, equation (11) becomes $$\hat{T} = \hat{n} - \hat{h}/\rho \qquad (12)$$

Total angular momentum vector $h$ can be expressed in terms of body axes 1, 2, and 3 by the expression $$\bar{h} = h_1 \hat{1} + h_2 \hat{2} + h_3 \hat{3} \qquad (13)$$

Unit vector $\hat{h}$ is therefore $$\hat{h} = (h_1 \hat{1} + h_2 \hat{2} + h_3 \hat{3}) \qquad (14)$$

where $h$ is the magnitude of the total angular momentum vector $\bar{h}$ and is equal to $$\sqrt{h_1^2 + h_2^2 + h_3^2} \qquad (15)$$

Orbit normal vector $\hat{n}$ may also be written in terms of body axes $\hat{1}, \hat{2},$ and $\hat{3}$ as follows:

$$\hat{n} = -\cos(90 - \phi)\,\hat{1} + \cos(90° - \Psi)\,\hat{2} + (\cos \Psi \cos \phi)\,\hat{3} \qquad (16)$$

or $$\hat{n} = -(\sin \phi)\,\hat{1} + (\sin \Psi)\,\hat{2} + (\cos \Psi \cos \phi)\,\hat{3} \qquad (17)$$

When the yaw and roll attituted error angles, respectively $\Psi$ and $\phi$, are very small $$\hat{n} = -\phi \hat{1} + \Psi \hat{2} + \hat{3} \qquad (18)$$

since the sine of a very small angle is the angle itself in radians while the cosine of a small angle is 1. Substituting equation (17) into equation (12) gives $$\hat{T} = [(-\phi - h_1/h)\,\hat{1} + (\Psi - h_2/h)\,\hat{2} + (1 - h_3/h)\,\hat{3}]/\rho \qquad (19)$$

If the attitude controller is designed to maintain the $h_1$ and $h_2$ components of the total angular momentum vector $\bar{h}$ small and the pitch-axis attitude controller is designed such that the $h_3$ component of the total angular momentum vector $\bar{h}$ is always approximately equal to the magnitude $h_\omega$ of bias momentum vector $h_\omega$ the magnitude $h$ (given by expression 15) of the total angular momentum vector $\bar{h}$ is approximately equal to the magnitude $h_\omega$ of the bias momentum vector $\bar{h}_\omega$. Under these conditions, the equation (19) becomes $$\hat{T} = [(-\phi - h_1/h_\omega)\,\hat{1} + (\Psi - h_2/h_\omega)\,\hat{2}]/\rho \qquad (20)$$

In a spacecraft which is designed to be geometrically and dynamically balanced such that the secondary products of inertia are negligible in comparison to the principle moments to inertia lying along the spacecraft's body axes $\hat{1}, \hat{2}$ and $\hat{3}$ the components of the total angular $h_1$ and $h_2$ momentum may be written as follows:

$$h_1 = I_1 \omega_1 \qquad (21)$$

and $$h_2 = I_2 \omega_2, \qquad (22)$$

where $I_1$ and $I_2$ are, respectively, the yaw and roll principal momentum of inertia and $\omega_1$ and $\omega_2$ are, respectively, the yaw and roll body axis rates of angular attitude error previously defined. Under these conditions, equation (20) becomes $$\hat{T} = -[\phi + (I_1/h_\omega)\,\omega_1]\,\hat{1} + [\Psi - (I_2/h_\omega)\,\omega_2]\,\hat{2}/\rho \qquad (23)$$

Since $\hat{T}$ is a unit vector, it should be apparent that $$\rho = \sqrt{[\phi + (I_1/h_\omega)\,\omega_1]^2 + [\Psi - (I_2/h_\omega)\,\omega_2]^2} \qquad (24)$$

It should be noted that although certain assumptions were made in the derivation of the expression for the precession angle $\rho$ (equation 24) through which total angular momentum vector $\bar{h}$ must be rotated to bring it into alignment with orbit normal vector $\hat{n}$, and the direction of the actual torque $\bar{T}$ (equation 23), which must be applied to achieve this rotation, such assumptions apply to specific characteristics of the spacecraft of FIG. 1 and are not necessary to practice the invention in general. It should further be noted that further approximations may be made to further simplify the form of the expressions derived. Further, other similar expressions for $\bar{T}$ and $\rho$ may be derived in a similar manner for other spacecrafts operating under other control laws, which can be utilized in the same manner as will be described.

Figure 4:
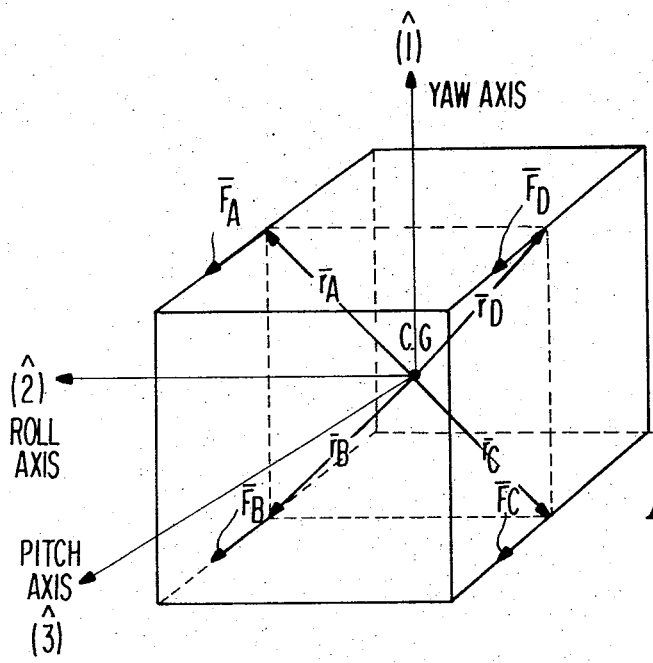
FIG. 4 is a vector force diagram of the forces produced by one coplanar set of orbit adjust thrusters of the spacecraft of FIG. 1.
Figure 5:
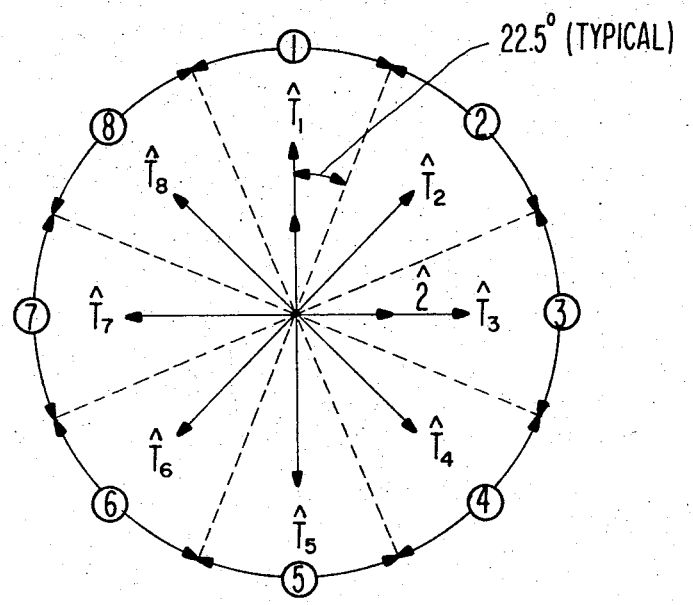
FIG. 5 is a vector diagram of the combination torque vectors produced by combining torques resulting from firing selected thrusters of a set of coplanar thrusters of the spacecraft of FIG. 1.

Development of the Torque Available From Firing Thrusters Singly or in Combination (FIGS. 4 and 5)

The actual or ideal torque $\bar{T}$, which should be approximate to spacecraft 10 of FIG. 1 to cause the rotation total angular momentum vector $\bar{h}$ about vector $\bar{\omega}_p$, through precession angle $\rho$, and into coincidence with orbit normal vector $\hat{n}$, is not generally available from the configuration of the spacecraft 10's orbit adjust thrusters A through H. It is, however, possible to utilize orbit adjust thrusters A through H to be selectively fired in accordance with the computations of precession angle $\rho$ and yaw and roll attitude error rates $\omega_1$ and $\omega_2$, respectively, to closely approximate the actual or ideal torque $\bar{T}$. Before describing how thrusters A through H are selectively operated to approximately actual or ideal torque $\bar{T}$, the possible torque combinations available from the fixed orbit adjust thruster configuration of spacecraft 10 of FIG. 1 will be described. This description is directed at only one set of coplanar thrusters, that is, thrusters A through D. A similar procedure will be apparent for the coplanar thruster set consisting of thrusters E through H.

FIG. 4 is a vector force diagram of the forces available by firing thrusters A through D of spacecraft 10 of FIG. 1. Force vectors $\bar{F}_A$ through $\bar{F}_D$ representing respectively the forces produced by firing thrusters A through D of originals in a plane which is coincident with the plane defined by the jaw and roll unit vectors, respectively, $\hat{1}$ and $\hat{2}$, and are directed in the positive pitch axis $\hat{3}$ direction. The origin of the three body axes, yaw, roll and pitch, respectively unit vectors $\hat{1}$, $\hat{2}$ and $\hat{3}$, is located at the center of gravity C.G. of spacecraft 10.

The locations of force vectors $\hat{F}_A$, $\hat{F}_B$, $\hat{F}_C$ and $\hat{F}_D$ from the center of gravity C.G. are indicated respectively by the location vectors $\hat{r}_A$, $\hat{r}_B$, $\hat{r}_C$ and $\hat{r}_D$. The location vectors $\hat{r}_A$, $\hat{r}_B$, $\hat{r}_C$ and $\hat{r}_D$ are also known as moment arm or torque arm vectors in the art.

The moment arm vectors have components along both the yaw and roll unit vectors, respectively, $\hat{1}$ and $\hat{2}$, and may therefore be written as:

$$\bar{r}_A = r_{A1} \hat{1} + r_{A2} \hat{2} \tag{25}$$

$$\bar{r}_B = -r_{B1} \hat{1} + r_{B2} \hat{2} \tag{26}$$

$$\bar{r}_C = -r_{C1} \hat{1} - r_{C2} \hat{2} \tag{27}$$

$$\hat{r}_D = r_{D1} \hat{1} - r_{D2} \hat{2} \tag{28}$$

where $r_{A1}$, $r_{B1}$, $r_{C1}$, and $r_{D1}$ are the components of vectors $\bar{r}_A, \bar{r}_B, \bar{r}_C,$ and $\bar{r}_D$, respectively, along the yaw $\hat{1}$ axis and $r_{A2}$, $r_{B2}$, $r_{C2}$, and $r_{D2}$ are the components of the vectors $\bar{r}_A, \bar{r}_B, \bar{r}_C,$ and $\bar{r}_D$, respectively, along the roll $\hat{2}$ axis The thruster force vectors are directly along the pitch axis and therefore, may be written as:

$$\bar{F}_A = F_A \hat{3} \tag{29}$$

$$\bar{F}_B = F_B \hat{3} \tag{30}$$

$$\bar{F}_C = F_C \hat{3} \tag{31}$$

$$\bar{F}_D = F_D \hat{3} \tag{32}$$

The torque produced by a force applied at a first point whose location is defined by a vector originating at a second point is the vector cross product of the two vectors. Therefore, the torque produced by the firing of thruster A is $$\bar{T}_A = \bar{r}_A \times \bar{F}_A = r_{A2}F_A \hat{1} - r_{A1}F_A \hat{2} \tag{33}$$

According to the theory of vector cross products $\bar{T}_A$ is a vector perpendicular to the plane defined by vectors $\bar{F}_A$ and $\bar{r}_A$ and passing through center of gravity C.G.

The firing of thruster A causes a clockwise rotation about torque vector $\bar{T}_A$ and passing through the center of gravity of the spacecraft, C.G.. Torque vectors $\bar{T}_B$, $\bar{T}_C$ and $\bar{T}_D$ may be similarly mathematically expressed by the following equations:

$$\bar{T}_B = \bar{r}_B \times \bar{F}_B = r_{B2}F_B \hat{1} + r_{B1}F_B \hat{2} \tag{34}$$

$$\bar{T}_C = \bar{r}_C \times \bar{F}_C = -r_{C2}F_C \hat{1} + V_{C1}F_C \hat{2} \tag{35}$$

$$\bar{T}_D = \bar{r}_D \times \bar{F}_D = 1r_{D1}F_D \hat{1} - r_{D2}F_D \hat{2}. \tag{36}$$

Torque vectors $\bar{T}_A$, $\bar{T}_B$, $\bar{T}_C$ and $\bar{T}_D$ are all coplanar in the plane defined by the yaw and roll unit vectors, respectively $\hat{1}$ and $\hat{2}$.

The combinations possible from using either one or a pair of torques $\bar{T}_A$, $\bar{T}_B$, $\bar{T}_C$, $\bar{T}_D$ are given as follows:

$$\overline{T}_1 = (\overline{T}_A + \overline{T}_B) = (r_{A2}F_A + r_{B2}F_B)\,\hat{1} + (-r_{A1}F_A + r_{B1}F_B)\,\hat{2}$$

(37)

$$\overline{T}_2 = \overline{T}_B = (r_{B2}F_B)\,\hat{1} + (r_{B2}F_B)\,\hat{2}$$

(38)

$$\overline{T}_3 = (\overline{T}_B + \overline{T}_C) = (r_{B2}F_B - r_{C2}F_C)\,\hat{1} + (r_{B2}F_B + r_{C1}F_C)\,\hat{2}$$

(39)

$$\overline{T}_4 = \overline{T}_C = (-r_{C2}F_C)\,\hat{1} + (r_{C1}F_C)\,\hat{2}$$

(40)

$$\overline{T}_5 = (\overline{T}_C + \overline{T}_D) = (-R_{C2}F_C - r_{D1}F_D)\,\hat{1} + (r_{C1}F_C - r_{D2}F_D)\,\hat{2}$$

(41)

$$\overline{T}_6 = \overline{T}_D = (-r_{D1}F_D)\,\hat{1} + (-r_{D2}F_D)\,\hat{2}$$

(42)

$$\overline{T}_7 = (\overline{T}_A + \overline{T}_D) = (r_{A2}F_A - r_{D1}F_D)\,\hat{1} + (-r_{A1}F_A - r_{D2}F_D)\,\hat{2}$$

(43)

$$\overline{T}_8 = \overline{T}_A = (r_{A2}F_A)\,\hat{1} + (-R_{A1}F_A)\,\hat{2}$$

(44)

It should now be clear that for a particular spacecraft coplanar orbit adjust thruster configuration there exists a number of torques which are combinations of primary torques created when one of the coplanar orbit adjust thrusters is fired. In particular, torque vectors $\overline{T}_1$ through $\overline{T}_8$ are the torque combinations available from the single firing of one of the coplanar thrusters or at most the firing of two of the coplanar thrusters of the spacecraft of FIG. 1. Since the primary torques $\overline{T}_A$, $\overline{T}_B$, $\overline{T}_C$, $\overline{T}_D$, are coplanar so are the combination torques $\overline{T}_1$ through $\overline{T}_8$. If all the momentum arm vectors $\overline{r}_A$, $\overline{r}_B$, $\overline{r}_C$, and $\overline{r}_D$ are equal in magnitude, that is, if all the thrusters A through D are equidistant from the center of gravity C.G. of spacecraft 10, and all the force vectors $\overline{F}_A$, $\overline{F}_B$, $\overline{F}_C$ and $\overline{F}_D$ are equal, the combination torques $\overline{T}_1$ through $\overline{T}_8$, lie along directions which are separated from one another by 45°.

Unit vectors, $\hat{T}_1$ through $\hat{T}_8$, indicating, respectively, the directions of the combination torque vectors $\overline{T}_1$ through $\overline{T}_8$ produced by combining torques resulting from firing selected thrusters of the set of coplanar thrusters consisting of thrusters A through D are shown in FIG. 5. The dotted lines in FIG. 5 indicate the equal zones 1 through 8 surrounding each of the unit vectors $\hat{T}_1$ through $\hat{T}_8$.

OPERATION OF THE THRUSTER SYSTEM OF FIG. 3

In the operation of attitude control system 24 of FIG. 3, on board computer 26 selects the thruster firing configuration which results in a torque which best appoximates the ideal or actual torque and then initiates the control signals necessary to carry out attitude correction as will be explained. To select the thruster firing configuration on board computer 26 uses the digital angular attitude error signals $\phi$ and $\psi$ and the digital angular error rates ($\omega_1$ and $\omega_2$) to calculate precession angle $\rho$ and ideal torque $\overline{T}$ from equations (23) and (24) by digital arithmetic manipulations by hardware or software program control as well known in the art. In the calculation of $\overline{T}$ and $\rho$, it is to be noted that the only variables in equations (23) and (24) are the angles $\phi$ and $\psi$ and angular rates $\omega_1$ and $\omega_2$, which are stored in memory registers, and which are constantly updated as the maneuver progresses. Further, the constant elements in equations (23) and (24) have previously been stored in memory locations from which they are available upon demand.

Equation (23) may be simplified to the expression $\hat{T} = \alpha\hat{1} + \beta\hat{2}$
where $\alpha$ and $\beta$ are respectively the coefficients of $\hat{1}$ and $\hat{2}$ in equation (23). An examination of equation (23) shows that coefficients $\alpha$ and $\beta$ may each lie in the range between +1.0 and −1.0, since $\hat{T}$ is a unit vector. Table 1 indicates which thruster pair of thrusters in the coplanar thruster set comprising thrusters A through D must be commanded to fire by a board computer 26 to produce a torque which best approximates the direction of actual or ideal torque $\overline{T}$ according to the values of coefficients $\alpha$ and $\beta$. The table also indicates in which torque zone of FIG. 5 the actual or ideal torque $\overline{T}$ resides.

| COEFFICIENT VALUES | TORQUE ZONE | FIRE THRUSTERS |
|---|---|---|
| If $0.924 \leq \alpha \leq 1.0$ and $-0.383 \leq \beta \leq +0.383$ | 1 ($\hat{T}_1$) | A,B |
| If $0.383 \leq \alpha \leq 0.924$ and $0.383 \leq \beta \leq 0.924$ | 2 ($\hat{T}_2$) | B |
| If $-0.383 \leq \alpha \leq 0.383$ and $0.924 \leq \beta \leq 1.0$ | 3 ($\hat{T}_3$) | B,C |
| If $-0.924 \leq \alpha \leq 0.383$ and $0.383 \leq \beta \leq 0.924$ | 4 ($\hat{T}_4$) | C |
| If $-1.0 \leq \alpha \leq -0.924$ and $-0.383 \leq \beta \leq 0.383$ | 5 ($\hat{T}_5$) | C,D |
| If $-0.924 \leq \alpha \leq -0.383$ and $-0.924 \leq \beta \leq -0.383$ | 6 ($\hat{T}_6$) | D |
| If $-0.383 \leq \alpha \leq 0.383$ and $-1.0 \leq \beta \leq -0.924$ | 7 ($\hat{T}_7$) | A,D |
| If $0.383 \leq \alpha \leq 0.924$ and $-0.924 \leq \beta \leq -0.383$ | 8 ($\hat{T}_8$) | A |

TABLE I

It should be noted that a similar selection is made to correct the attitude error of spacecraft 10 when coplanar thrusters E through H are fired to cause an orbit adjustment in the positive pitch $\hat{3}$ direction. It will be apparent to those skilled in the art that if the aforesaid equality conditions for force vectors $\bar{F}_A$, $\bar{F}_B$, $\bar{F}_C$, and $\bar{F}_D$ and for moment arm vectors $\bar{r}_A$ $\bar{r}_B$, $\bar{r}_C$, and $\bar{r}_D$ are not met, the unit vectors indicating the directions of the combination vectors available from the single or combined firings of coplanar orbit adjust thrusters will not be spaced at equal angular distances nor will the corresponding zones be equal. However, it will be further appreciated that this will not affect the general operation of attitude control system 24 to be described but rather that unequal torque zones will be defined from which the actual or ideal torque is to be approximated. In the development of equations (23) and (24) it was indicated that momentum bias type spacecraft 10 is roll-/yaw stabilized when total angular momentum vector $\bar{h}$ is colinear with the orbit normal vector $\hat{n}$ and has a magnitude equal to the magnitude of the momentum bias vector $\bar{h}_\omega$. Thruster control system 22 of FIG. 3 must, therefore, control the direction of total angular momentum vector $\bar{h}$ and additionally must control the angular attitude error rates $\omega_1$ and $\omega_2$ such that the magnitude of the total angular momentum vector $\bar{h}$ is equal to the magnitude of bias momentum vector $\bar{h}_\omega$ in order to achieve roll/yaw attitude stabilization.

In operation, thruster control system 24 of FIG. 3 operates in three modes under the control of on-board computer 26 to achieve attitude correction during orbit inclination adjustments.

In a first mode, all of the coplanar orbit adjust thrusters in a coplanar set of thrusters are fired simultaneously for a time $T_{max}$ to establish a new orbital position. $T_{max}$ is an input constant reflecting the numerical value of the sum of engine "on" times at which the new orbit has been reached and the orbit adjustment manuever is terminated. As was previously mentioned, while spacecraft 10 is in mode 1 operation, its attitude is being disturbed due to the causal influences of geometric and thruster force imbalances.

In mode 2, a selected configuration of thrusters within a coplanar set of thrusters are firing with the objective of controlling the direction or precession of the total angular momentum vector $\bar{h}$. Mode 2 is activated whenever the precession angle $\rho$ exceeds a predetermined threshold $\rho_{DB1}$. Thruster control system 24 remains in mode 2 until $\rho$ is reduced to a minimum below a second threshold $\rho_{DB2}$.

In mode 3 operation a selected configuration of engines are controlled to fire with the objective of controlling either the roll or yaw attitude rates respective $\omega_2$ and $\omega_1$, or both, thereby controlling the magnitude of the total angular momentum $\bar{h}$. During the rate reduction cycle of mode 3 the nutational or coning motion of the bias momentum vector $\bar{h}_\omega$ about the total angular momentum vector $\bar{h}$ is limited. Mode 3 consists of the detection of the magnitude and sign of $\omega_1$ and $\omega_2$ and sequentially reducing each upon determination that predetermined rate threshold $\omega_{DB}$ has been exceeded. A constraint on the rate control capability of thruster control system 24 is determined by the minimum impulse force of thrusters A through H. The rate threshold $\omega_{DB}$ must be selected consistent with this minimal rate removal capacity of thruster control system 24.

Before describing the particulars of the sequential operation of on-board computer 26 to perform attitude correction, it is to be noted that thruster control system 24 has a mode hierarchy. That is normally, thruster control system 24 is in mode 1 with all the thrusters within a coplanar set of thrusters activated. Upon completion of a pass through mode 1, testing is performed to determine if mode 2 or 3 should be entered. Further, exit from mode 2, the precession mode, is always to mode 3, the rate mode, and the exit from mode 3 is always to mode 1. At least one pass through mode 1 is made before either of the other two modes are made.

FIGS. 6a through 6d are flow diagrams indicating sequential operation of on-board computer 26 in controlling the attitude of spacecraft 10 while undergoing simultaneous orbit inclination adjustment. It is well known in the art how to implement the flow diagram of FIGS. 6a through 6d in a computer either under hardware or softward control and a detailed description of the logic or the program language necessary to accomplish this embodiment is not deemed necessary.

For the purposes of the description of the operation of thruster control system 24, it will be assumed that the set of coplanar thrusters consisting of thrusters A through D are being fired thereby moving spacecraft 10 of FIG. 1 along path 16 to achieve new orbit path 12a. It should be evident that a similar control sequence is undertaken when the coplanar set of thrusters consisting of thrusters E through H are simultaneously fired to move spacecraft 10 in the positive pitch axis $\hat{3}$ direction.

When orbit inclination adjustment is to be performed, a preoperational period is initiated including the activation of roll and yaw integrating rate gyros, respectively 44 and 46, by the transmittal of a gyro "turn on" command to gyro control electronics unit 42. During this preoperational period gyro rate data, consisting of incremental attitude errors $\Delta\phi$ and $\Delta\psi$, is read into on-board computer 26 and arithmatically manipulated as previously described such that the variables $\psi$, $\omega_1$, $\phi$, $\omega_2$ are computed and stored in memory storage location from which they are thereafter available. These variables are continuously read in and computed and stored for use over the entire orbit adjustment period. It should also be recalled that the constants equations (23) and (24) are also stored in memory locations and are available for control computations by on-board computer 26.

Figure 6A:
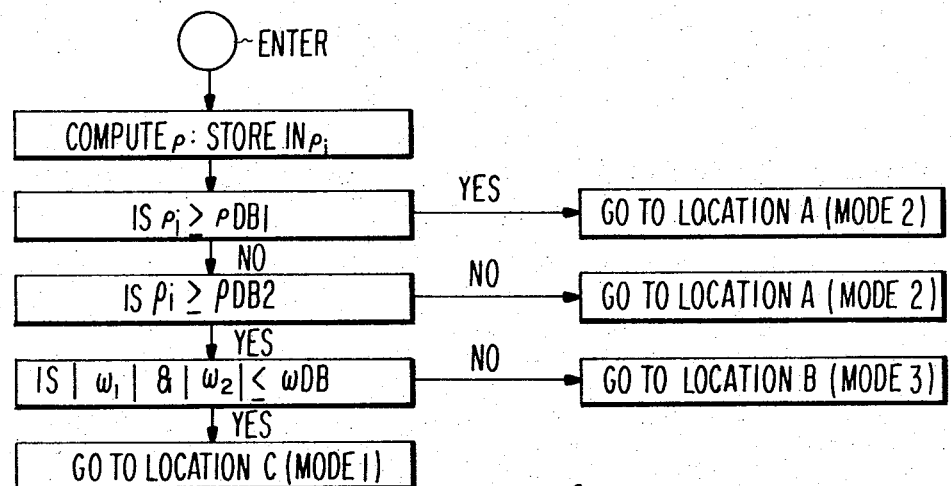
FIGS. 6A–6D are the flow diagram of the sequential operation of the thruster control system of FIG. 3.

FIG. 6a is a flow diagram of the portion of the control sequencing which is always entered at the initiation of the orbit adjustment maneuver to provide an orderly entry into the control sequence. In this portion of the control sequencing, the initial precession angle $\rho$ is computed and stored in memory location $\rho_i$. The precession angle $\rho_i$ is first compared to a minimum threshold level $\rho_{DB1}$ and if it is equal or greater than $\rho_{DB1}$ mode 2 operation is initated. If $\rho_i$ is less than $\rho_{DB1}$ a second threshold test is performed wherein $\rho_i$ is compared to maximum threshold value $\rho_{DB2}$. If $\rho_i$ is greater than $\rho_{DB2}$ mode 2 operation is initiated. If $\rho_i$ is less than or equal to $\rho_{DB2}$ a test is performed to determine if the magnitudes of angular rates $\omega_1$ and $\omega_2$ are less than or equal to the angular rate threshold $\omega_{DB}$. If the magnitude of either $\omega_1$ or $\omega_2$ exceed $\omega_{DB}$ mode 3 operation is initiated. If the magnitude of either $\omega_1$ and $\omega_2$ is less than or equal to $\omega_{DB}$ mode 1 operation is initiated. It is to be noted that two threshold determinations are made rather than one. That is, control mode 2 is only entered when the initial precession angle $\rho_i$ is between thresholds $\rho_{DB1}$ and $\rho_{DB2}$. The minimum threshold $\rho_{DB1}$ corresponds to the minimum angular attitude error which thruster control system 24 can correct. No attempt to correct attitude is made if $\rho$ is less than $\rho_{DB1}$. The resultant attitude error is not considered significant in the overall performance of spacecraft 10. The maximum threshold $\rho_{DB2}$ corresponds to the threshold level which, if exceeded, requires that angular attitude rates $\omega_1$ and $\omega_2$ may have to be reduced by mode 3 operation before proceeding. If $\rho_{DB2}$ is not equaled or exceeded mode 2 is entered to reduce the precession angle $\rho$ without requiring that angular rates $\omega_1$ and $\omega_2$ are reduced.

Figure 6B:
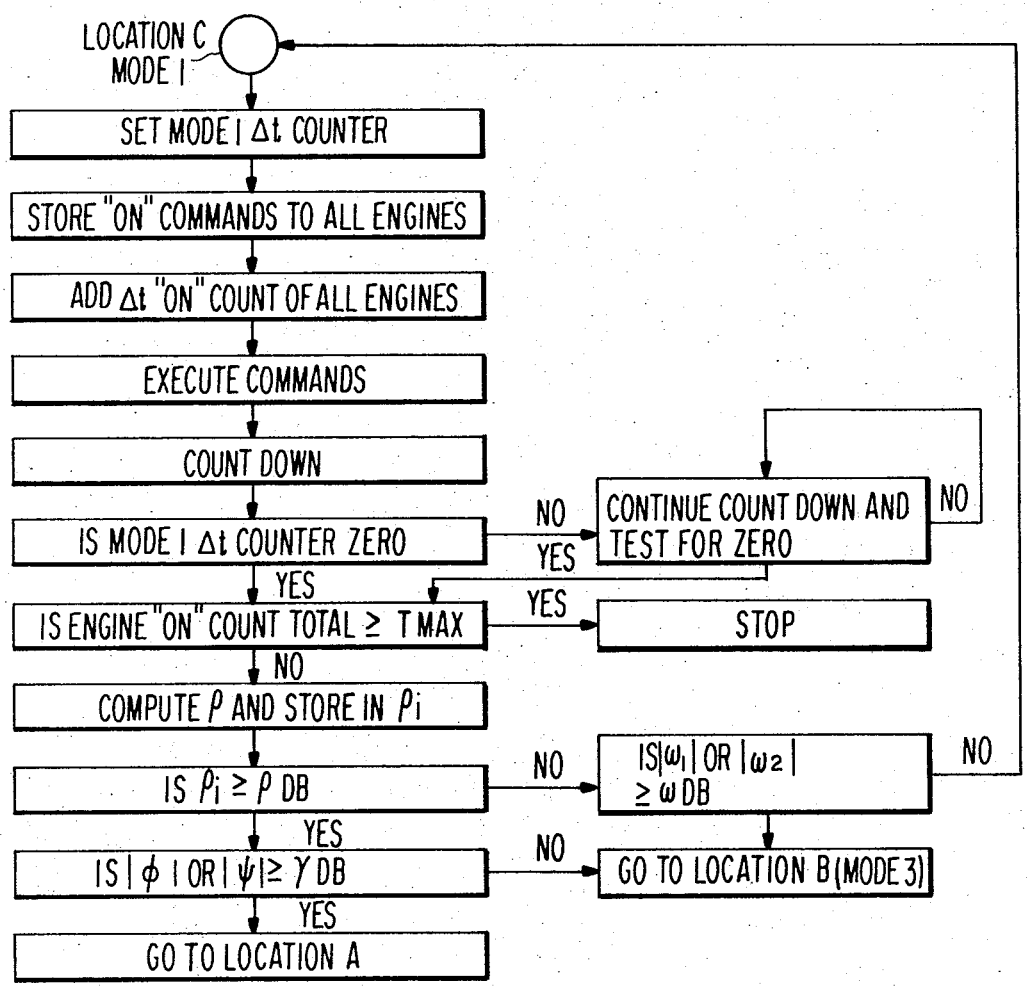

FIG. 6b is the flow diagram for the sequential operation of thruster control system 24 during "all engines on" mode 1. The mode 1 $\Delta t$ counter within on-board computer 26 is set to the binary number representing the minimal thruster impulse time of a thruster. On commands which cause all the thrusters within the coplanar set consisting of thrusters A through H to fire simultaneously for $\Delta t$ are stored but not yet executed. Thereafter, the engine on command for all engines are executed and a countdown sequence measuring the time duration of firing is initiated. The countdown is continued until the mode 1 $\Delta t$ counter reaches zero. If at this point, the time elapsed is greater or equal to $T_{max}$ the time required to achieve orbit inclination, all the engines are stopped and the sequencing comes to an end. It should be noted that another precession angle $\rho$ and angular attitude error rate could be passed through if desired before stopping engine firing. If $T_{max}$ has not been exceeded, the attitude of the spacecraft is evaluated by a computation of the precession angle $\rho$, which is stored in memory location $\rho_t$ for future use, and a comparison to threshold value $\rho_{DB}$. If the binary number in memory location $\rho_i$ is greater or equal to the memory level $\rho_{DB}$, a test is made to determine whether either of the magnitudes of the angular error rates $\omega_1$ or $\omega_2$ exceed angular threshold rate $\rho_{DB}$. If the magnitudes of either error rate exceeds threshold $\omega_{DB}$ mode 3 is initiated, whereas if neither exceeds the threshold rate $\omega_{DB}$, another pass of mode 1 is initiated. If the precession angle stored in memory location $\rho_i$ excceds threshold $\rho_{DB}$, another test is initiated to determine if the magnitude of either the roll or yaw total angles, $\phi$ and $\psi$ respectively, exceed a threshold angle indicated as $\gamma_{DB}$. If $\gamma_{DB}$ is equaled or exceeded mode 3, is initiated otherwise mode 2 is initiated.

Figure 6C:
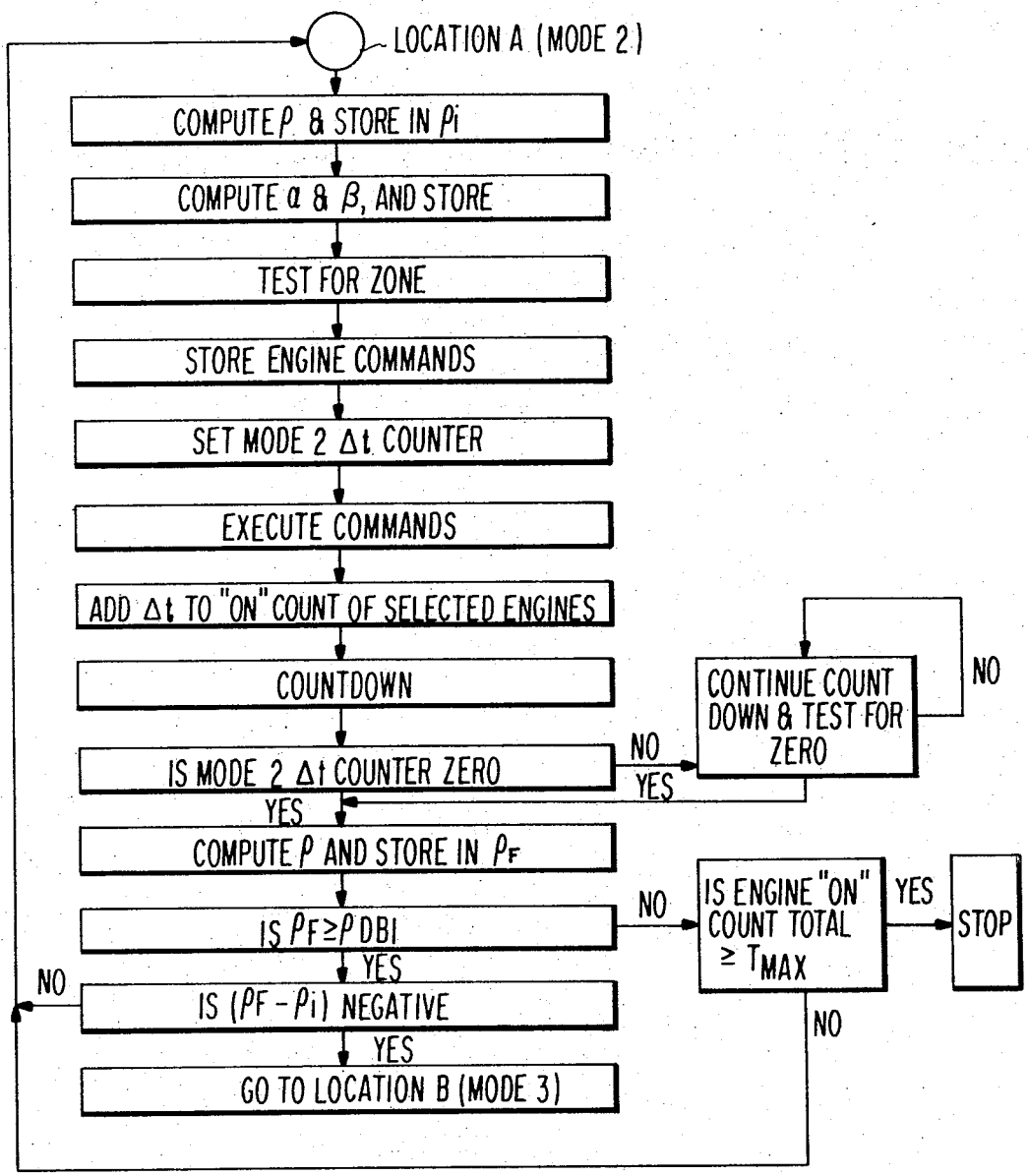

FIG. 6c is a flow diagram for the sequential operation during mode 2. During the first part of operation of thruster control system 24, the precession angle $\rho$ is recalculated and stored, he variables $\alpha$ and $\beta$ are calculated and stored, a test for the zone in which the actual torque $\overline{T}$ resides in (according to table 1) is made, and the engine on commands for all the thrusters within the correct planar set are set and executed. Thereafter, an additional minimum impulse firing time $\Delta t$ is added to the registers controlling the firing times of the selected engines according to the zone location of actual torque $\overline{T}$. A test is performed to determine if the mode 2 $\Delta t$ register has reached zero. When the test indicates that firing time register for mode 2 is zero $\rho$ is again calculated and stored in a memory location $\rho_F$. Thereafter, the binary value stored in memory location $\rho_F$ is compared to threshold value $\rho_{DB1}$. If $\rho_F$ is less than $\rho_{DB1}$, a test is made to determine whether or not $T_{max}$ has been equaled or exceeded, and if so, the engines are stopped. If the total elapsed time has not exceeded $T_{max}$, mode 2 is again initiated. If $\rho_F$ has exceeded or equaled $\rho_{DB1}$, another test is performed to determine if the difference between $\rho_F$ and $\rho_i$ is negative. If a negative result is determined, mode 3 is initiated, otherwise, mode 2 is again initiated.

Figure 6D:
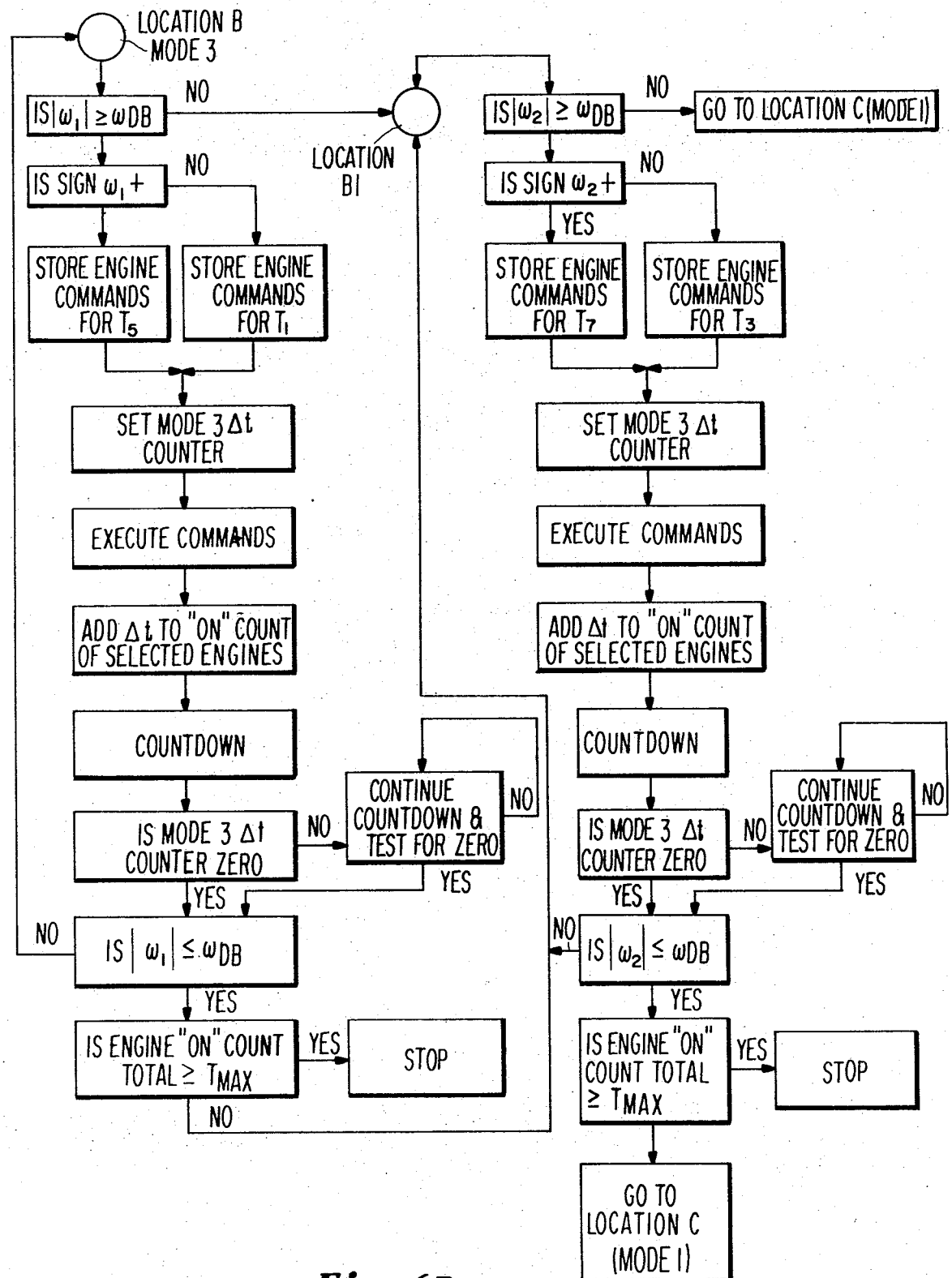

FIG. 6D is the flow diagram for the sequential operation of attitude control system 24 during mode 3. This mode sequentially reduces attitude rate errors $\omega_1$ and $\omega_2$ as required. Upon entering mode 3, the magnitude of the yaw error rate $\omega_1$ is compared to threshold value $\omega_{DB}$. If $\omega_{DB}$ is not exceeded, location B1 of FIG. 6d is entered in which the magnitude of the yaw attitude angular rate $\omega_2$ is compared to threshold $\omega_{DB}$. If the magnitude of $\omega_1$ is equaled or exceeded $\omega_{DB}$, the sign of $\omega_1$ is examined and engine commands are set to produce either torques $\overline{T}_1$ or $\overline{T}_5$ of Table 1. That is, if the sign of $\omega_1$ is positive thrusters A and B are fired simultaneously whereas if the sign is negative thrusters C and D are simultaneously fired. Thereafter, all the thrusters within the coplanar set of thrusters being utilized commanded to fire and an additional minimal firing time is added to the registers which control the firing of the selected engines in accordance with Table 1. When the mode 3 firing time has reached zero, another comparison of the magnitude of $\omega_1$ is made to threshold $\omega_{DB}$. If the magnitude of $\omega_1$ has exceeded $\omega_{DB}$, another pass through mode 3 is initiated. Otherwise, the total duration time of this maneuver is compared to $T_{max}$. If the total duration time has equaled or exceeded $T_{max}$, the engines are stopped. Otherwise, a test is initiated beginning at location $B_1$ to determine if the magnitude of $\omega_2$ has exceeded $\omega_{DB}$. Location $B_1$ initiates a sequence of operation concerning $\omega_2$, which is similar to the sequence for $\omega_1$, and will not be described in detail because its similarity to that of the sequence for $\omega_1$. When the sequencing for the $\omega_2$ has been finished, the engines are either commanded to stop or mode 1 is again initiated.

Although the operation of thruster control system 24 was described as proceeding in accordance to a preferred mode hierarchy, it will be appreciated by those skilled in the art, that other similar mode hierarchies may be used to control the sequential operation of thruster control system 24. For instance, it is possible that mode 3 operation (rate mode) precede mode 2 operation precession.

It should now be understood that a thruster control system for a spacecraft is provided according to this invention which controls the firing of individual thrusters within a set of orbit adjust thrusters singly or in combination to perform both the function of orbit adjustment and attitude control thereby enabling attitude control during the orbit adjust maneuver overcoming the requirement for a separate attitude control system.

What is claimed is:

1. A thruster control system for a spacecraft comprising:
   a. a plurality of body-mounted orbit adjust thrusters adapted to develop a thrust along a given axis of said spacecraft when operated jointly to thereby change the orbit of said spacecraft and to develop a torque when less then all said thrusters are operated, b. attitude sensing means for determining the attitude of said spacecraft relative to a reference to generate error signals,
c. an on-board computer for controlling the operation of said thrusters, said computer comprising
 c1. means responsive to a command signal for operating all said thrusters to develop a thrust of said spacecraft thereby to change the orbit of said spacecraft, and
 c2. means responsive to said attitude error signals to inhibit a selected number of said thrusters while the orbit of said spacecraft is being changed to develop a torque to correct the attitude of said spacecraft.

2. A thruster control system for adjusting the orbit path and controlling the total angular momentum of a spacecraft, comprising:
 an orbit adjust thrusters set comprising a plurality of thrusters mounted on said spacecraft, said thrusters adapted to change the orbit of said spacecraft;
 thruster firing control means for selectively firing a selected number of said thrusters,
 attitude sensing means for determining the angular displacement of a first set of vectors defining the body axes of said spacecraft from a second set of vectors originating at the origin of said first set of vectors and defining an attitude reference, said sensing means generating incremental angular attitude error signals manifesting incremental angular rotations of vectors within said first set of vectors about respective vectors within said second set of vectors; and
 an on-board computer coupled to said attitude sensing means and to said thruster firing control means said on-board computer adapted to generate a first control signal to said thruster firing control means in response to a command signal to fire said thrusters simultaneously, said on-board computer responsive to said incremental attitude error signals for computing the respective rates of change of said incremental angular attitude errors, the precession angle between said total angular momentum vector and a predetermined vector within said second set of vectors, and the direction of the ideal torque required to reduce the precession angle, said on-board computer initiating a precession mode wherein a first configuration of thrusters is selected and fired in accordance with the direction of said ideal torque to reduce said precession angle whenever said precession angle exceeds a predetermined precession threshold, said on-board computer initiating a rate mode wherein a second configuration of thrusters is selected and fired in accordance with the sense of said angular attitude error rates to control the magnitude of said total angular momentum vector whenever the magnitude of any of said angular attitude error rates exceeds a predetermined rate threshold.

3. A thruster control system to adjust the orbit path and control the attitude of a spacecraft wherein said attitude is defined by the magnitude and direction of the total angular momentum vector of said spacecraft, comprising:
 an orbit adjust thruster set comprising a plurality of thrusters mounted on said spacecraft, said thrusters causing said spacecraft to move between a first orbit path and a second orbit path when said thrusters are caused to fire simultaneously;
 thruster firing control means for selectively firing selected ones of said thrusters;
 attitude sensing means for determining the angular displacement of a first set of vectors defining the body axes of said spacecraft from a second set of vectors originating at the orgin of said first set of vectors and defining an attitude reference, said sensing means producing incremental angular attitude error signals manifesting incremental angular rotation of vectors within said first set of vectors about respective vectors within said second set of vectors; and
 an on-board computer coupled to said attitude sensing means and to said thruster firing control means, said on-board computer adapted to generate a first control signal to said thruster firing control means at a predetermined time in an all thruster on mode of operation to cause said thrusters to fire simultaneously for a predetermined time duration, said on-board computer responding to said incremental angular attitude error signals for computing therefrom the respective attitude angular error rates, the precession angle defining the angular displacement of said total angular momentum vector from a predetermined one of said second set of vectors, and the direction of the ideal torque necessary to reduce said precession angle, said on-board computer comparing said precession angle to a predetermined precession threshold value and initiating a precession mode of operation if said threshold is exceeded wherein said on-board computer selects a first configuration of thrusters in accordance with the direction of said ideal torque and applies a second control signal to said thruster firing control means to cause the selected thrusters within said first configuration to fire for an incremental time in addition to such predetermined time duration to reduce said precession angle, said on-board computer comparing the magnitudes of said angular attitude error rates to a predetermined attitude error rate threshold value and initiating a rate mode of operation if said threshold is exceeded by the magnitude of any of said angular attitude error rates wherein said on-board computer selects a second configuration of thrusters in accordance with the sense of said angular attitude error rate whose magnitude exceeds said predetermined rate threshold and applies a third control signal to said thrust firing control means to cause the selected thrusters with said second configuration to fire for an incremental time in addition to said predetermined duration to reduce said angular attitude rate.

4. The control system recited in claim 3 wherein said on-board computer applies thruster firing control signals to said thruster firing control means in accordance to a mode hierarchy wherein at least one pass through said all thruster on mode is made before entering either said precession mode or said rate mode, said rate mode always following said precession mode, and said first mode always following said rate mode.

5. The control system recited in claim 3 further including means for inhibiting said attitude sensing means during periods when no thrusters are fired and enabling said attitude sensing means when said thrusters are to be fired.

6. An attitude and orbit adjust control system for a spacecraft having a total angular momentum vector whose magnitude and direction define the attitude of said spacecraft comprising:

attitude sensing means for determining the angular displacement of a first set of vectors defining the body axes of said spacecraft from a second set of vectors originating at the origin of said first set of vectors and defining an attitude reference, said first set of vectors including first, second, and third orthogonal body axis vectors, said sensing means adapted to generate a first incremental angular attitude error signal manifesting incremental angular rotation of said first body axis vector about said second body axis vector and a second incremental angular attitude error signal manifesting incremental angular rotation of said second body axis vector about said first body axis vector;

bias control means for preventing rotation of said spacecraft about said third body axis vector, the stability of said spacecraft in relation to said third body axis due to said bias control means being manifested by a bias momentum vector;

an orbit adjust thruster set comprising a plurality of thrusters mounted on said spacecraft, said thrusters arranged to move said spacecraft from a first orbit to a second orbit when all of said plurality of thrusters are fired simultaneously, to develop a torque when less than all of said plurality of thrusters are fired, the resultant torque defining a torque zone;

thruster firing control means for selectively firing selected said thrusters; and an on-board computer coupled to said attitude sensing means and to said thruster firing control means, said on-board computer generating a first control signal to said thruster firing control means at a predetermined time in an all thrusters on mode of operation to cause all of said plurality of said thrusters to fire simultaneously, said on-board computer responding to said first and second incremental angular error signals and computing therefrom the respective angular attitude error rates, the precession angle between said total angular momentum vector and a predetermined vector within said second set of vectors, and the directin of the ideal torque to reduce the precession angle, said computer comparing said precession angle to a predetermined precession threshold and initiating a precession mode wherein a first configuration of thrusters is selected in accordance to the torque zone wherein the direction of said ideal torque lies and a second control signal is applied to said thruster firing control means to cause to said first configuration of thrusters to fire simultaneously to produce a torque to reduce said precession angle whenever said precession angle exceeds said predetermined precession threshold, said computer comparing the magnitude of said angular attitude error rates to a predetermined rate threshold and initiating a rate mode wherein a second configuration of thrusters is selected in accordance with the sense of said angular attitude error rates and a third control signal is applied to said thruster firing control means to cause said second configuration of thrusters to fire simultaneously to control the magnitude of said total angular momentum vector so that it substantially equals the magnitude of said bias momentum vector whenever the magnitude of either of said angular attitute error rates exceeds said predetermined rate threshold.

7. The control system recited in claim 6 wherein said on-board computer applies thruster firing control signals to said thruster firing control means in accordance with a mode hierarchy wherein at least one pass through said first mode is made before entering either said precession mode or said rate mode, said rate mode following said precession mode, and said first mode following said rate mode.

8. The control system recited in claim 6 wherein said first control signals causes all of said plurality of thrusters to fire simultaneously for a predetermined time duration and said second and third control signals causes the selected thrusters within said first and second set of thrusters, respectively, to fire simultaneously for an incremental time duration in addition to said predetermined time duration.

9. The control system recited in claim 6 wherein said bias control means includes a momentum wheel mounted to rotate in a plane parallel to said first and second body axes.

10. The control system recited in claim 6 wherein said first, second, and third body axes are respectively yaw, roll, and pitch axes and said predetermined vector of said second set of vectors defining an attitude reference is the orbit normal vector.

11. The control system recited in claim 10 wherein each of said thrusters is aligned along an axis parallel to said pitch axis.

12. The control system recited in claim 6 further including means for inhibiting said attitude sensing means during periods when no thrusters are fired and enabling said attitude sensing means when said thrusters are to be fired.

13. The control system recited in claim 6 wherein said attitude sensing means includes first and second rate integrating rate gyros operating in the rate integrating mode and integrating means to integrate the output signals of said first and second rate integrating rate gyros to produce said first and second incremental angular attitude error signals respectively.

14. A method of adjusting the oribt and controlling the attitude of a spacecraft having an orbit adjust set of thrusters comprising a plurality of thrusters which may be fired singly or in combination and whose attitude is defined by the magnitude and direction of the total angular momentum of said spacecraft, comprising the steps:

a. sensing the angular displacement of members of a first set of vectors defining the body axes of said spacecraft about respective members of a second set of vectors originating at the origin of said first set of vectors and defining an attitude reference;

b. determining the rates of angular displacement;

c. computing from said angular displacement, said rates of said angular displacement and predetermined spacecraft constants, in accordance with the control laws of said spacecraft, the precession angle between the total angular momentum vector and a predetermined one of said second set of vectors and the direction of ideal torque required to reduce said precession angle;

d. causing all of said plurality of thrusters to fire simultaneously to cause said spacecraft to move from a first orbit path to a second orbit path;

e. comparing said precession angle to a predetermined precession threshold value and causing a first configuration of thrusters to fire in accordance with the direction of said ideal torque to reduce said precession angle whenever said precession angle exceeds said predetermined precession threshold; and f. comparing the magnitudes of said rates of angular displacement to a predetermined rate threshold and causing a second configuration of thrusters to fire in accordance with the sense of said angular rates to control the magnitude of said total angular momentum vector whenever the magnitude of any of said rates of angular displacement exceeds said predetermined rate threshold.

15. The method recited in claim 14 wherein firing configuration of thrusters containing less than all of said plurality of thrusters produces combination torques which define torque zones, said first configuration of thrusters being selected to fire in accordance to the torque zone wherein said ideal torque lies.

16. The method recited in claim 14 wherein step (d) precedes steps (e) and (f), step (e) precedes step (f), and step (d) follows step (f).

17. The method recited in claim 14 wherein steps (a), (b), and (c) follow step (d) in the order named.

18. The method recited in claim 16 wherein said all of said plurality of thrusters are fired simultaneously for a predetermined time duration in step (d) and the thrusters within said first and second configuration are fired for an additional incremental time in steps (e) and (f) respectively.

* * * * *

UNITED STATES PATENT OFFICE
CERTIFICATE OF CORRECTION

PATENT NO. : 3,866,025
DATED : February 11, 1975
INVENTOR(S) : John Denis Cavanagh It is certified that error appears in the above-identified patent and that said Letters Patent are hereby corrected as shown below:

Column 7, line 67, "$\frac{\Delta\Psi}{\Delta_{1_{\Delta\phi}}}$" should be --$\frac{\Delta\Psi}{\Delta t_{\Delta\Psi}}$--;

Column 8, lines 7-12 delete "ther use in ... memory locations."; Column 11, line 21 "approximate" should be --applied--; Column 13, line 7, Equation (38) "$(r_{B2}F_B)$" second occurrence should be --$(r_{B1}F_B)$--;

Column 13, line 11, Equation (39) "$(r_{B2}F_B$" second occurrence should be --$(r_{B1}F_B$--; Column 13, line 20, Equation (41) "$(-R_{C2}$" should be --$(-r_{C2}$--;

Column 13, line 34, Equation (44) "$(-R_{A1}$" should be --$(-r_{A1}$--;

Column 17, line 57 "he" should be --the--; Column 21, line 44 "directin" should be --direction--.

Signed and sealed this 10th day of June 1975.

(SEAL)
Attest:

RUTH C. MASON
Attesting Officer

C. MARSHALL DANN
Commissioner of Patents
and Trademarks